(12) United States Patent
Jiang (10) Patent No.: US 8,153,301 B2
(45) Date of Patent: Apr. 10, 2012

(54) CATHODE COMPOSITIONS FOR LITHIUM-ION ELECTROCHEMICAL CELLS

(75) Inventor: Junwei Jiang, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 211 days.

(21) Appl. No.: 12/420,128

(22) Filed: Apr. 8, 2009

(65) Prior Publication Data

US 2010/0015516 A1 Jan. 21, 2010

Related U.S. Application Data

(63) Continuation-in-part of application No. 12/176,694, filed on Jul. 21, 2008, now abandoned.

(51) Int. Cl.
  *H01M 4/58* (2010.01)
(52) U.S. Cl. ............ 429/231.1; 429/224; 429/223; 429/342; 429/209; 252/519.1
(58) Field of Classification Search ............ 429/231.1, 429/224, 223, 342, 209; 252/519.1
See application file for complete search history.

(56) References Cited

U.S. PATENT DOCUMENTS

| | | | |
|---|---|---|---|
| 5,393,622 A * | 2/1995 | Nitta et al. | 429/223 |
| 5,536,599 A | 7/1996 | Alamgir et al. | |
| 5,709,968 A | 1/1998 | Shimizu | |
| 5,763,119 A | 6/1998 | Adachi | |
| 5,858,573 A | 1/1999 | Abraham et al. | |
| 5,882,812 A | 3/1999 | Visco et al. | |
| 6,004,698 A | 12/1999 | Richardson et al. | |
| 6,045,771 A * | 4/2000 | Matsubara et al. | 429/231.1 |
| 6,045,952 A | 4/2000 | Kerr et al. | |
| 6,333,128 B1 | 12/2001 | Sunagawa et al. | |
| 6,387,570 B1 | 5/2002 | Nakamura et al. | |
| 6,387,571 B1 | 5/2002 | Lain et al. | |
| 6,395,250 B2 | 5/2002 | Matsubara et al. | |
| 6,551,744 B1 | 4/2003 | Ohzuku et al. | |
| 6,677,082 B2 | 1/2004 | Thackeray et al. | |
| 6,680,143 B2 | 1/2004 | Thackeray et al. | |
| 6,780,544 B2 | 8/2004 | Noh | |
| 6,964,828 B2 | 11/2005 | Lu et al. | |
| 7,011,907 B2 | 3/2006 | Noguchi et al. | |
| 7,238,450 B2 | 7/2007 | Howard et al. | |
| 7,341,804 B2 | 3/2008 | Christensen et al. | |
| 7,368,071 B2 | 5/2008 | Dahn et al. | |
| 7,556,655 B2 | 7/2009 | Dahn et al. | |
| 7,674,556 B2 | 3/2010 | Nakura et al. | |
| 2001/0010807 A1 | 8/2001 | Matsubara | |
| 2004/0058243 A1 | 3/2004 | Ohzuku et al. | |
| 2005/0221168 A1 | 10/2005 | Dahn et al. | |
| 2005/0221196 A1 | 10/2005 | Dahn et al. | |
| 2006/0148996 A1 | 7/2006 | Coggio et al. | |
| 2006/0177737 A1 | 8/2006 | Tode et al. | |
| 2006/0263696 A1 | 11/2006 | Kim et al. | |
| 2006/0263697 A1 | 11/2006 | Dahn et al. | |
| 2007/0082269 A1 | 4/2007 | Akita et al. | |
| 2007/0148546 A1 | 6/2007 | Shimizu et al. | |
| 2007/0218359 A1 | 9/2007 | Shimizu et al. | |
| 2008/0032196 A1 | 2/2008 | Park et al. | |
| 2008/0090150 A1 | 4/2008 | Nakura | |

FOREIGN PATENT DOCUMENTS

| | | |
|---|---|---|
| CN | 1545158 | 11/2004 |
| EP | 1 296 391 A1 | 3/2003 |
| JP | 2003-002663 | 1/2003 |
| JP | 2003-017049 | 1/2003 |
| JP | 2003-308842 | 10/2003 |
| JP | 2005-038629 | 2/2005 |
| JP | 2006-040572 | 2/2006 |
| JP | 2007-258094 | 10/2007 |
| JP | 2007-287569 | 11/2007 |
| JP | 2008-016243 | 1/2008 |

OTHER PUBLICATIONS

Yoshio et al., "Preparation of $Li_yMn_xNi_{1-x}O_2$ as a cathode for lithium-ion batteries," *Journal of Power Sources*, 74, pp. 46-53 (1998).
Rossen et al., "Structure and electrochemistry of $Li_xMn_yNi_{1-y}O_2$," *Solid State Ionics*, 57, pp. 311-318 (1992) ..
Jiang et al., *Electrochemistry Communications*, vol. 6, pp. 39-43 (2004).
Sun et al., "Synthesis and Electrochemical Properties of Layered $LiNi_{frax;1;2}Mn_{frax;1;2}O_2$ Prepared by Coprecipitation," *Journal of Applied Electrochemistry*, pp. 151-156 (2005).
Li et al., "Changes in the Cation Ordering of Layered O3 $Li_xNi_{0.5}Mn_{0.5}O_2$ During Electrochemical cycling to High Voltages: An Electron Diffraction Study," *Chem. Mater.*, 19, pp. 2551-2565 (2007).
Zhang et al., "Synthesis and Electrochemical Properties of Layered Li—Ni—Mn—O Compounds," *Journal of Power Sources*, 110, pp. 57-64 (2002).
Zhang et al., "Properties of Li—Ni—Mn—O Electrode Materials Prepared from Solution Spray synthesized Powders," *Materials Letters*, 59, pp. 2693-2697 (2005).

(Continued)

Primary Examiner — Laura Weiner
(74) Attorney, Agent, or Firm — Stephen F. Wolf (57) ABSTRACT

Provided are compositions useful as cathodes for lithium-ion batteries. The compositions include lithium mixed metal oxides of the formula, $Li[Li_xNi_yMn_z]O_2$, wherein $x+y+z=1$, $0<x<0.20$, $0.28 \leq y \leq 0.75$, and $0.25 \leq z \leq 0.49$, said composition characterized as being in the form of a single phase. Also provided are electrodes that include the provided compositions as well as battery packs and electronic devices that include the provided electrodes.

16 Claims, 5 Drawing Sheets

OTHER PUBLICATIONS

Li et al., "Morphological, Structural, and Electrochemical Characteristics of $LiNi_{0.5}Mn_{0.4}M_{0.1}O_2$ (M=Li, Mg., Co, Al)," *Journal of Power Sources*, 157, pp. 488-493 (2006).

Myung et al., "Synthesis of $Li[(Ni_{0.5}Mn_{0.5})_{1-x}Li_x]O_2$ by Emulsion Drying Method and Impact of Excess Li on Structural and Electrochemical Properties," *Chem. Mater.*, 18, pp. 1658-1666 (2006).

* cited by examiner

*Fig. 4b*

CATHODE COMPOSITIONS FOR LITHIUM-ION ELECTROCHEMICAL CELLS

RELATED APPLICATIONS

This application is a continuation-in-part of U.S. application Ser. No. 12/176,694, filed Jul. 21, 2008, now abandoned, the disclosure of which is herein incorporated by reference in its entirety.

FIELD

This invention relates to compositions useful as cathodes for lithium-ion batteries.

BACKGROUND

Lithium-ion batteries typically include an anode, an electrolyte, and a cathode that contains lithium in the form of a lithium-transition metal oxide. Examples of transition metal oxides that have been used in cathodes include lithium transition metal oxides that comprise various amounts of cobalt, nickel, and manganese. Cobalt is the most expensive of these transition metal oxides. However, most mixed transition metal oxide materials contain some amount of cobalt to stabilize the desired layered O3 crystal structure. Additionally, not all transition metal oxide cathode materials exhibit an optimal combination of high initial capacity, high thermal stability, and good capacity retention after repeated charge-discharge cycling.

SUMMARY

Provided are cathode compositions, electrodes, and lithium-ion batteries incorporating these compositions, that exhibit one or more advantages such as high initial capacities, high average voltages, and good capacity retention after repeated charge-discharge cycling. In addition, the provided cathode compositions do not evolve substantial amounts of heat at elevated temperatures, thereby improving battery safety. In some embodiments, the provided compositions exhibit several, or even all, of these advantages.

In one aspect, provided is a cathode composition that includes a lithium mixed metal oxide composition having the formula, $Li[Li_xNi_yMn_z]O_2$, wherein $x+y+z=1$, $0<x<0.20$, $0.28 \leq y \leq 0.75$, and $0.25 \leq z \leq 0.49$, said composition in the form of a single phase. In some embodiments, the phase can have an O3 crystal structure.

In another aspect, provided is a method of making a cathode composition that includes a lithium mixed metal oxide composition having the formula, $Li[Li_xNi_yMn_z]O_2$ that includes coprecipitating a mixed nickel and manganese hydroxide with a nickel to manganese atomic ratio of y/z to form a hydroxide precursor, mixing the solid precursor with a stoichiometric amount of lithium carbonate to form a mixture; and firing the mixture at a temperature of between about 700° C. and about 1000° C., wherein $x+y+z=1$, $x+y+z=1$, $0<x<0.20$, $0.28 \leq y \leq 0.75$, and $0.25 \leq z \leq 0.49$, said composition in the form of a single phase having an O3 crystal structure, and wherein the composition does not undergo a phase transformation to a spinel crystal structure when the electrode is incorporated into a lithium-ion battery and cycled for 100 full charge-discharge cycles at 30° C. and has a final capacity of at least 210 mAh/g at 4.6 V.

The provided cathode compositions and methods of making electrodes, electrochemical cells, and electronic devices incorporating electrochemical cells that include the provided cathode compositions can provide lower cost electrochemical cells that can exhibit high temperature stability, can have high initial capacity, and can retain good capacity after repeated charge-discharge cycling of the cell.

The details of one or more embodiments are set forth in the accompanying drawings and the description below. Other features, objects, and advantages will be apparent from the description and drawings, and from the claims.

DETAILED DESCRIPTION

In the following description, reference is made to the accompanying set of drawings that form a part of the description hereof and in which are shown by way of illustration several specific embodiments. It is to be understood that other embodiments are contemplated and may be made without departing from the scope or spirit of the present invention. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The provided cathode compositions for a lithium-ion electrochemical cell include a lithium mixed metal oxide composition that is in the form of a single phase having O3 layered crystal structure. The compositions can have the formula, $Li[Li_xNi_yMn_z]O_2$, where
$x+y+z=1.0$, $0<x<0.20$, $0.28 \leq y \leq 0.75$, and $0.25 \leq z \leq 0.49$. The provided compositions can be essentially free of cobalt and can exhibit excellent electrochemical cycling performance and capacity stability when incorporated into a lithium-ion electrochemical cell. These compositions also have excellent thermal stability.

The provided compositions have excess lithium ($x>0$) on a molar basis. In some embodiments, $0.05 \leq x \leq 0.17$. In other embodiments, $0.10 \leq x \leq 0.15$. The provided compositions can have a molar amount of Ni (represented by y) of from 0.28, from 0.30, or even from 0.32 to 0.75, to 0.73, or even to 0.71. The provided compositions can also have a molar amount of Mn (represented by z) from 0.25, from 0.27, or even from 0.29 to 0.49, to 0.48, or even to 0.47 provided that $x+y+z=1$. The Mn can be in the +4 oxidation state. The provided cathode compositions can adopt the O3 layered structure that can be desirable for efficient lithiation and delithiation. Spinel structures are also within the scope of the structure of the provided cathodes to the extent that materials with spinel structures are able to delithiate and lithiate without significant loss of capacity.

In some embodiments, the provided cathode compositions can have high specific capacity (mAh/g) retention when made into a cathode, incorporated into a lithium ion battery, and cycled through multiple charge/discharge cycles. For example, in some embodiments the provided cathode compositions can have a specific capacity of greater than 170 mAh/g, greater than 190 mAh/g, or even greater than 210 mAh/g. In other embodiments the provided cathode compositions can maintain high specific capacity after 50, after 75, after 100, or even more charging and discharging cycles at rates of C/4 when the battery is cycled between about 2.5 V and about 4.6 V vs. Li/Li$^+$ and the temperature is maintained at about room temperature (25° C.).

In some embodiments, the provided cathode compositions can exhibit good thermal stability. One method of measuring thermal stability is subjecting a pellet made from the provided compositions to accelerated rate calorimetry (ARC) testing to measure the onset temperature of self-heating. The provided compositions have an onset temperature of greater than 170° C., greater than 190° C., or even greater than 200° C.

The provided compositions can be synthesized by any suitable method. One such method involves combining water-soluble precursors of the metal elements (e.g., hydroxides, nitrates, sulfates, and the like), coprecipitating the mixed oxide salts with a base (such as NaOH), filtering, washing, and drying the precipitate, mixing and milling or grinding the precipitate with a source of lithium such as $Li_2CO_3$ or LiOH, followed by heating the mixture to generate the cathode composition. Heating is preferably conducted in air at a maximum temperature of at least about 600° C., e.g., at least about 800° C., but typically no greater than about 950° C.

To make an electrode, the provided composition, additives such as binders, conductive diluents, fillers, adhesion promoters, thickening agents for coating viscosity modification such as carboxymethylcellulose and other additives known by those skilled in the art can be mixed in a suitable coating solvent such as water or N-methylpyrrolidinone (NMP) to form a coating dispersion or coating mixture. The dispersion can be mixed thoroughly and then applied to a foil current collector by any appropriate coating technique such as knife coating, notched bar coating, dip coating, spray coating, electrospray coating, or gravure coating. The current collectors can typically be thin foils of conductive metals such as, for example, copper, aluminum, stainless steel, or nickel foil. The dispersion or mixture can be coated onto the current collector foil and then allowed to dry in air followed usually by drying in a heated oven, typically at about 80° C. to about 300° C. for about an hour to remove the solvent.

Electrodes made from cathode compositions of this disclosure can be combined with an anode and an electrolyte to form a lithium-ion electrochemical cell or a battery pack from two or more electrochemical cells. Examples of suitable anodes can be made from compositions that include lithium, carbonaceous materials, silicon alloy compositions and lithium alloy compositions. Exemplary carbonaceous materials can include synthetic graphites such as mesocarbon microbeads (MCMB) (available from E-One Moli/Energy Canada Ltd., Vancouver, BC), SLP30 (available from TimCal Ltd., Bodio Switzerland), natural graphites and hard carbons. Useful anode materials can also include alloy powders or thin films. Such alloys may include electrochemically active components such as silicon, tin, aluminum, gallium, indium, lead, bismuth, and zinc and may also comprise electrochemically inactive components such as iron, cobalt, transition metal silicides and transition metal aluminides. Metal alloy compositions used to make anodes can have a nanocrystalline or amorphous microstructure. Such alloys can be made, for example, by sputtering, ball milling, rapid quenching, or other means.

Provided electrochemical cells can include an electrolyte. A variety of electrolytes can be employed. Representative electrolytes can contain one or more lithium salts and a charge-carrying medium in the form of a solid, liquid or gel. Exemplary lithium salts are stable in the electrochemical window and temperature range (e.g. from about −30° C. to about 70° C.) within which the cell electrodes can operate, are soluble in the chosen charge-carrying media, and perform well in the chosen lithium-ion cell. Exemplary lithium salts include $LiPF_6$, $LiBF_4$, $LiClO_4$, lithium bis(oxalato)borate, $LiN(CF_3SO_2)_2$, $LiN(C_2F_5SO_2)_2$, $LiAsF_6$, $LiC(CF_3SO_2)_3$, and combinations thereof Exemplary solid electrolytes include polymeric media such as polyethylene oxide, fluorine-containing copolymers, polyacrylonitrile, combinations thereof, and other solid media that will be familiar to those skilled in the art. Exemplary liquid electrolytes include ethylene carbonate, propylene carbonate, dimethyl carbonate, diethyl carbonate, ethyl-methyl carbonate, butylene carbonate, vinylene carbonate, fluoroethylene carbonate, fluoropropylene carbonate, γ-butylrolactone, methyl difluoroacetate, ethyl difluoroacetate, dimethoxyethane, diglyme (bis(2-methoxyethyl) ether), tetrahydrofuran, dioxolane, combinations thereof and other media that will be familiar to those skilled in the art. Exemplary electrolyte gels include those described in U.S. Pat. No. 6,387,570 (Nakamura et al.) and U.S. Pat. No. 6,780,544 (Noh). The solubilizing power of the electrolyte can be improved through addition of a suitable cosolvent. Exemplary cosolvents include aromatic materials compatible with Li-ion cells containing the chosen electrolyte. Representative cosolvents include sulfolane, dimethoxyethane, combinations thereof and other cosolvents that will be familiar to those skilled in the art. The electrolyte can include other additives that will familiar to those skilled in the art. For example, the electrolyte can contain a redox chemical shuttle such as those described in U.S. Pat. No. 5,709,968 (Shimizu), U.S. Pat. No. 5,763,119 (Adachi), U.S. Pat. No. 5,536,599 (Alamgir et al.), U.S. Pat. No. 5,858,573 (Abraham et al.), U.S. Pat. No. 5,882,812 (Visco et al.), U.S. Pat. No. 6,004,698 (Richardson et al.), U.S. Pat. No. 6,045,952 (Kerr et al.), and U.S. Pat. No. 6,387,571 B1 (Lain et al.); and in U.S. Pat. Appl. Publ. Nos. 2005/0221168, 2005/0221196, 2006/0263696, and 2006/0263697 (all to Dahn et al.).

The electrode composition can contain additives such as will be familiar to those skilled in the art. The electrode composition can include an electrically conductive diluent to facilitate electron transfer from the composition to a current collector. The conductive diluent can be added to the electrode composition that comprises tin, cobalt, and carbon in order to increase the contact of the composition with the current collector. Electrically conductive diluents include, but are not limited to, carbon (e.g., carbon black for negative electrodes and carbon black, flake graphite and the like for positive electrodes), metal, metal nitrides, metal carbides, metal silicides, and metal borides. Representative electrically conductive carbon diluents include carbon blacks such as SUPER P and SUPER S carbon blacks (both from MMM Carbon, Belgium), SHAWANIGAN BLACK (Chevron Chemical Co., Houston, Tex.), acetylene black, furnace black, lamp black, graphite, carbon fibers and combinations thereof.

The electrode composition can include an adhesion promoter that promotes adhesion of the composition and/or electrically conductive diluent to the binder. The combination of an adhesion promoter and binder can help the electrode composition better accommodate volume changes that can occur in the composition during repeated lithiation/delithiation cycles. The binders can offer sufficiently good adhesion to metals and alloys so that addition of an adhesion promoter may not be needed. If used, an adhesion promoter can be made a part of the lithium polyacrylate binder (e.g., in the form of an added functional group), can be a coating on the composition, can be added to the electrically conductive diluent, or can be a combination of such measures. Examples of adhesion promoters include silanes, titanates, and phosphonates as described in U.S. Pat. No. 7,341,804 (Christensen).

Provided electrochemical cells can be made by taking at least one each of a positive electrode and a negative electrode as described above and placing them in an electrolyte. Typically, a microporous separator, such as CELGARD 2400 microporous material, available from Hoechst Celanese Corp., Charlotte, N.C., can be used to prevent the contact of the negative electrode directly with the positive electrode. This can be especially important in coin cells such as, for example, 2325 coin cells as known in the art.

The disclosed electrochemical cells can be used in a variety of devices, including portable computers, tablet displays, personal digital assistants, mobile telephones, motorized devices (e.g., personal or household appliances and vehicles), instruments, illumination devices (e.g., flashlights) and heating devices. One or more electrochemical cells of this invention can be combined to provide battery pack. Further details regarding the construction and use of rechargeable lithium-ion cells and battery packs will be familiar to those skilled in the art.

Objects and advantages of this invention are further illustrated by the following examples, but the particular materials and amounts thereof recited in these examples, as well as other conditions and details, should not be construed to unduly limit this invention.

EXAMPLES

Preparative Examples

Preparative Example 1

Li[Li$_{0.067}$Mn$_{0.433}$Ni$_{0.5}$]O$_2$ 140.81 g of NiSO$_4$.6H$_2$O (Aldrich Chemical Co.) and 78.47 g of MnSO$_4$.H$_2$O (Aldrich Chemical Co.) were dissolved in distilled water within a 500 ml volumetric flask to from a 2 mol/L transition metal sulfate solution. Mn$_{0.46}$Ni$_{0.54}$(OH)$_2$ was prepared by co-precipitation method from the transition metal sulfate solution with NaOH solution at a PH value around 10. The precipitate was recovered by filtration and washed repeatedly using vacuum filtration. It was then placed in a box furnace set to 120° C. to dry. After grinding, 8.00 of precipitate powder (containing around 3% moisture) was mixed with 3.71 g of Li$_2$CO$_3$. The mixture powder was heated to 750° C. at a rate of 4° C./min and then soaked at that temperature for 4 hours. The mixture powder then was heated to 880° C. at 4° C./min and soaked for 4 hours. Afterwards, the powder was cooled down to room temperature at 4° C./min. After grinding, the powder then was passed through a 110-µm sieve.

Preparative Examples 2-5

Four other materials were prepared in analogous fashion. The materials were Li[Li$_{0.067}$Mn$_{0.333}$Ni$_{0.6}$]O$_2$ (Example 2), Li[Li$_{0.056}$Mn$_{0.319}$Ni$_{0.625}$]O$_2$ (Example 3), Li[Li$_{0.111}$Mn$_{0.389}$Ni$_{0.5}$]O$_2$ (Example 4), and Li[Li$_{0.167}$Mn$_{0.458}$Ni$_{0.375}$]O$_2$ (Example 5).

Electrochemical Cell Preparation
Thin Film Cathode Electrodes for Electrochemical Tests Electrodes were prepared as follows: 10% polyvinylidene difluoride (PVDF, Aldrich Chemical Co.) in N-methyl pyrrolidinone (NMP, Aldrich Chemical Co.) solution was prepared by dissolving about 10 g PVDF into 90 g of NMP solution. 7.33 g SUPER P carbon (MMM Carbon, Belgium), 73.33 g of 10% PVDF in NMP solution, and 200 g NMP solution were mixed in a glass jar. The mixed solution contained 2.6% of PVDF and SUPER P each in NMP. 5.25 g of the solution was mixed with 2.5 g cathode material using a MAZERUSTAR mixer machine (Kurabo Industries Ltd., Japan) for 3 minutes to form a uniform slurry. The slurry was then spread onto a thin aluminum foil on a glass plate using a 0.25 mm (0.010") notch-bar spreader. The coated electrode was then dried in an 80° C. oven for around 30 minutes. The electrode was then put into a 120° C. vacuum oven for 1 hour to evaporate NMP and moisture. The dry electrode contained about 90% cathode material and 5% PVDF and Super P each. The mass loading of the active cathode material was around 8 mg/cm$^2$.

Cell Construction for Thin Film Electrodes.

Coin cells were fabricated with the resulting cathode electrode (for each of Examples 1 to 5) and Li metal anode in a 2325-size (23 mm diameter and 2.5 mm thickness) coin-cell hardware in a dry room. The separator was CELGARD 2400 microporous polypropylene film (Hoechst-Celanese), which had been wetted with a 1M solution of LiPF$_6$ (Stella Chemifa Corporation, Japan) dissolved in a 1:2 volume mixture of ethylene carbonate (EC) (Aldrich Chemical Co.) and diethyl carbonate (DEC) (Aldrich Chemical Co.).

Cycle Testing of Cells

The cells were cycled from 2.5 V to 4.4 or 4.6 V at a rate of 10 mA/g in the first two cycles and 40 mA/g for later cycles at room temperature using a Maccor cycler. The cells were run through many cycles to determine the extent of capacity fade as a function of the number of cycles completed. Cells that exhibit low capacity fade are considered to have superior cycle life.

Accelerating Rate Calorimeter (ARC) Exotherm Onset Temperature for Different Cathode Materials.
Preparation of Pellet Electrodes for ARC Testing.

The method to prepare charged cathode materials for thermal stability tests by ARC is described in J. Jiang, et al., *Electrochemistry Communications*, 6, 39-43, (2004). Usually, the mass of a pellet electrode used for the ARC is a few hundred milligrams. A few grams of active electrode material were mixed with 7% by mass, each of SUPER P carbon black, PVDF, and excess NMP to make a slurry, following the same procedures described in A.1. After drying the electrode slurry at 120° C. overnight, the electrode powder was slightly ground in a mortar and then passed through a 300 µm sieve. A measured amount of electrode powder was then placed in a stainless steel die to which 13.8 Mpa (2000 psi) pressure was applied to produce an approximately 1 mm thick pellet electrode. A 2325-size coin cell was constructed using the positive electrode pellet and Mesocarbon microbeads (MCMB) (E-One Moli/Energy Canada Ltd., Vancouver, BC) of the same size as the pellet to balance the capacity of both electrodes. The cells were first charged to a voltage of 4.4V vs. Li, at a current of 1.0 MA. After reaching 4.4 V, the cells were allowed to relax to 4.1 V vs Li. Then the cells were then recharged to 4.4 V with half of the original current, 0.5 mA. After 4 cycles, the charged cells were transferred to a glove box and dissembled. The delithiated cathode pellets were taken out and rinsed with dimethyl carbonate (DMC) four times to remove the original electrolyte from the surface of charged cathode material. Then the sample was dried in the glove box vacuum antechamber for two hours to remove the residual DMC. Finally, the sample was lightly ground again to be used in the ARC tests.

ARC Exotherm Onset Temperature Measurement.

The stability test by ARC is described in J. Jiang, et al., *Electrochemistry Communications*, 6, 39-43, (2004). The sample holder was made from 304 stainless steel seamless tubing with a wall thickness of 0.015 mm (0.006 inches) (Microgroup, Medway, Mass.). The outer diameter of the tubing was 6.35 mm (0.250 inches) and the length of pieces cut for the ARC sample holders was 39.1 mm (1.540 inches). The temperature of the ARC was set to 110° C. to start the test. The sample was equilibrated for 15 min., and the self-heating rate was measured over a period of 10 min. If the self-heating rate was less than 0.04° C./min., the sample temperature was increased by 10° C., at a heating rate of 5° C./min. The sample was equilibrated at this new temperature for 15 min., and the self-heating rate was again measured. The ARC Exotherm Onset Temperature was recorded when the self-heating rate was sustained above 0.04° C./min. The test was stopped when the sample temperature reached 350° C. or the self-heating rate exceeded 20° C./min.

ARC Exotherm Onset Temperature with delithiated $LiMn_{1/3}Co_{1/3}Ni_{1/3}O_2$ with Electrolytes.

$LiMn_{1/3}Co_{1/3}Ni_{1/3}O_2$ (BC-618, average particle size 10 µm) was produced by 3M Company (US). The thermal stability tests of delithiated $LiMn_{1/3}Co_{1/3}Ni_{1/3}O_2$ in $LiPF_6$ EC/DEC (1:2 by volume) were conducted. These test results are displayed as Comparative Example A.

Results

Coin cells were made using electrodes made from each of the Examples 1-5. and all of these coin cells were cycled under the conditions listed above. The cycling results are displayed in FIGS. 1a to 1e, 2a to 2e, and FIG. 3.

FIGS. 1a to 1e graphically display the discharge capacity (mAh/g) vs cycle number of the cycled cells of Examples 1 to 5 respectfully. For all examples, the voltage remains very steady way past 120 cycles.

FIGS. 2a to 2e graphically display the voltage of the cells (Examples 1 to 5 respectfully) as a function of specific capacity (mAh/g) for the first two cycles. The irreversible capacity loss varies from less than 50 mAh/g (Example 1) to a little over 100 mAh/g (Example 4).

Figure 1A:
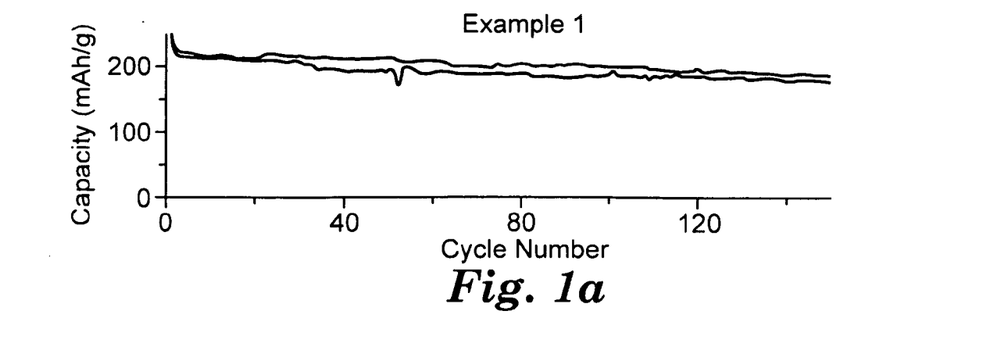
FIGS. 1a to 1e are graphs of discharge capacity (mAh/g) vs. cycle number for provided embodiments.
Figure 1B:
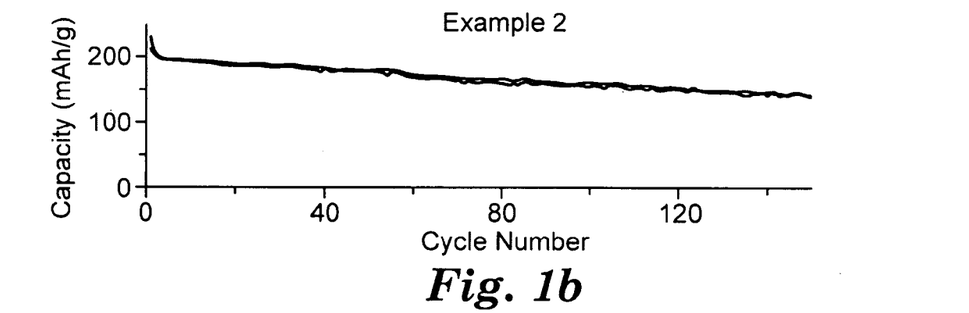
Figure 1C:
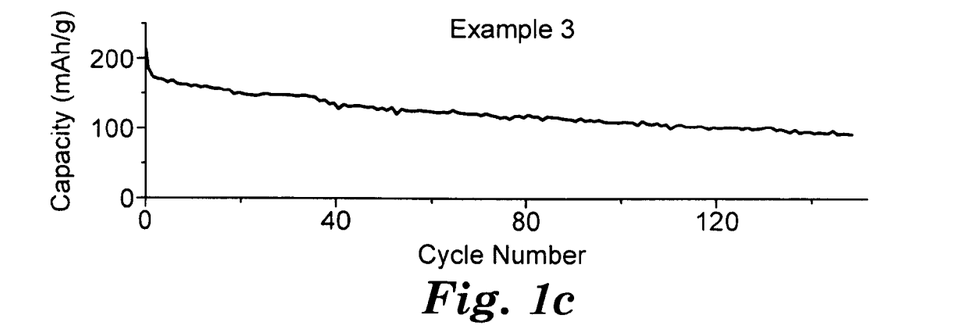
Figure 1D:
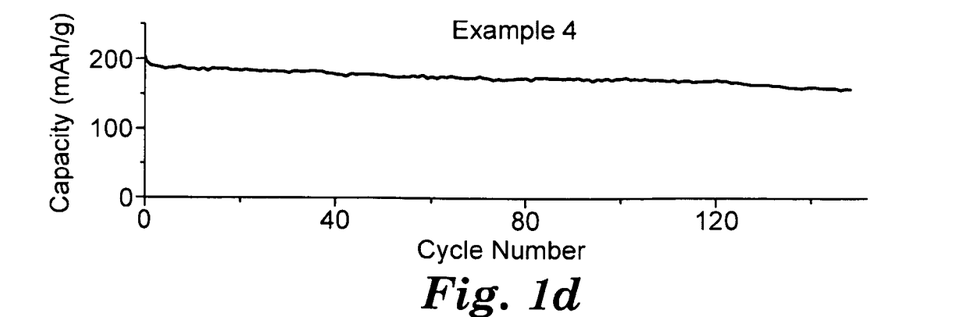
Figure 1E:
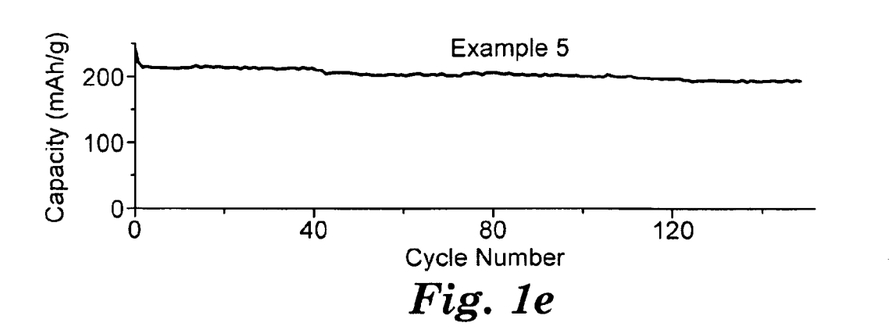
Figure 2A:
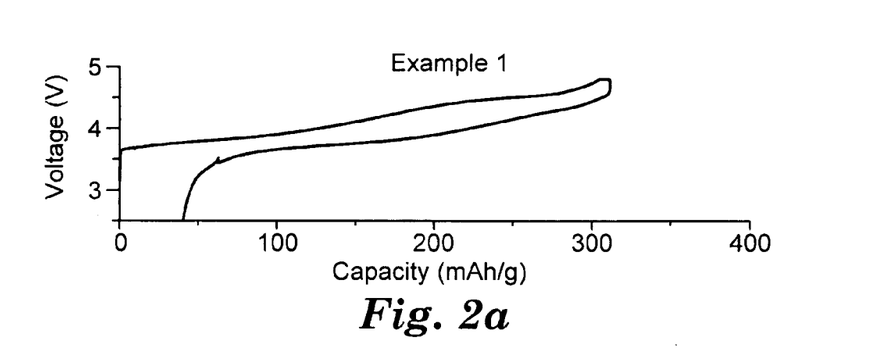
FIGS. 2a to 2e are graphs of voltage (V) vs. capacity (mAh/g) for provided embodiments.
Figure 2B:
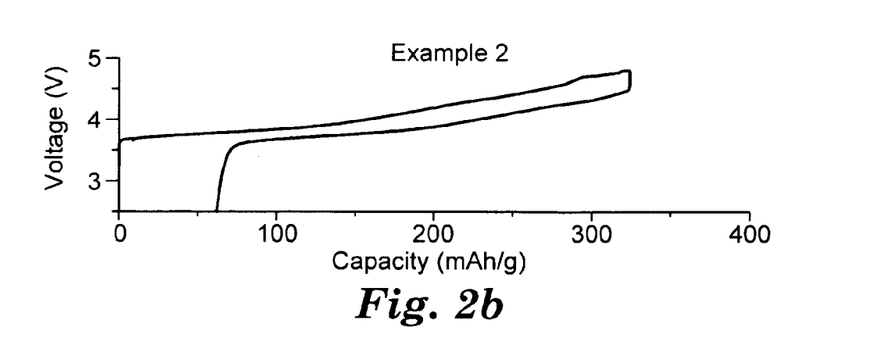
Figure 2C:
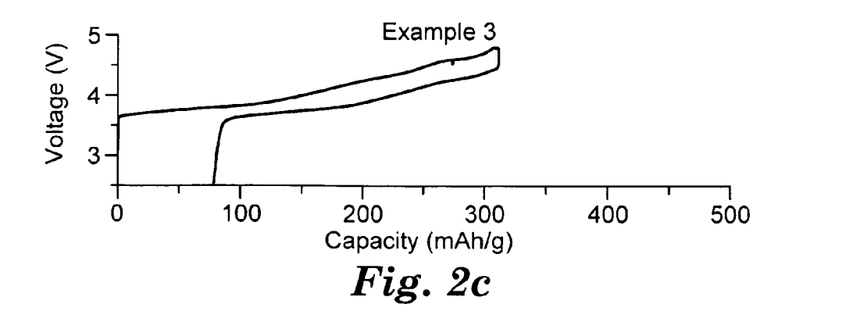
Figure 2D:
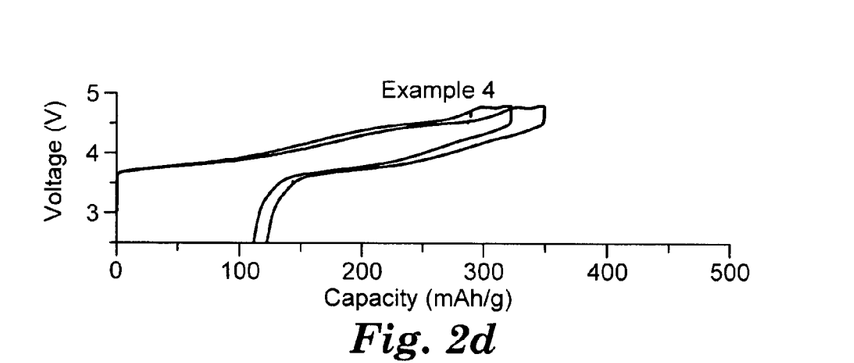
Figure 2E:
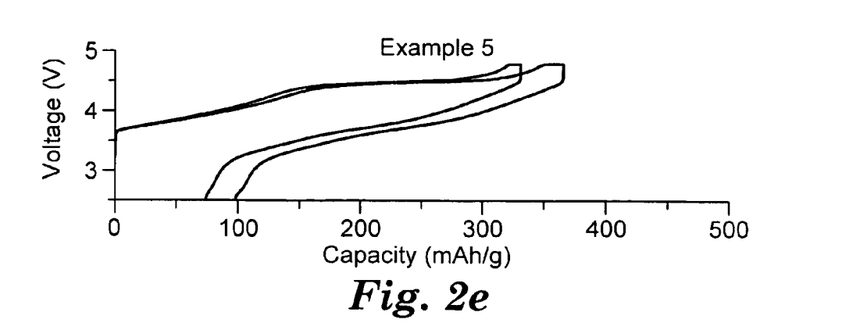
Figure 3:
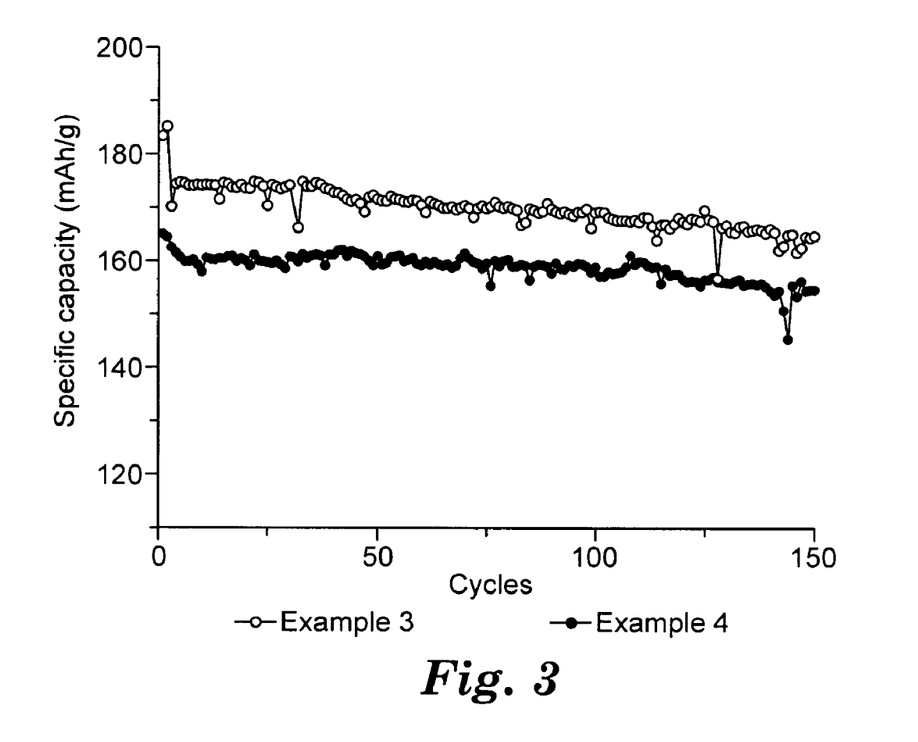
FIG. 3 is a graph of specific capacity (mAh/g) vs. cycle number for two provided embodiments.

FIG. 3 graphically displays the specific capacity of coin cells as a function of cycle number for two embodiments of coin cells that contain provided electrodes1—Examples 3 and 5. From this graph it is seen that cells with these electrodes maintain specific capacities of greather than about 160-170 mAh/g from 2.5V to 4.4V over up to 150 cycles.

Figure 4A:
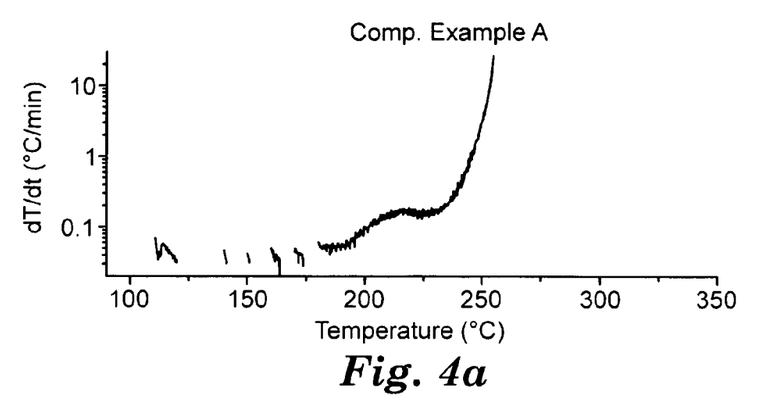
FIGS. 4a and 4b are graphs of accelerated rate calorimetry (ARC) displaying dT/dt (° C./min) vs. temperature (° C.) for two provided embodiments.
Figure 4B:
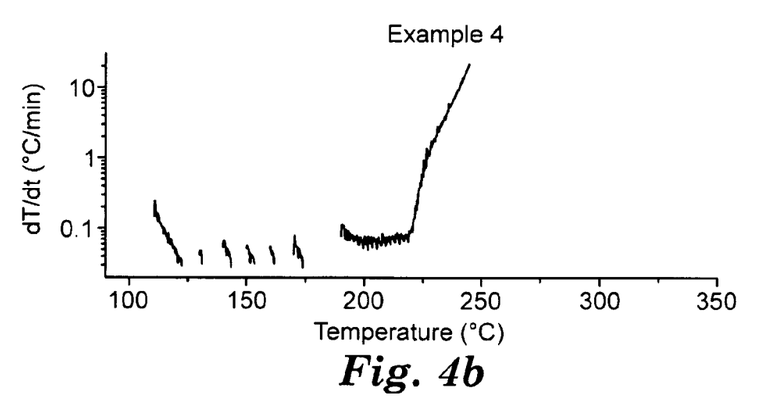

FIG. 4 is a graph that compares the onset temperture (measured by ARC testing) of a comparative cathode material (Comparative Example A—$LiMn_{1/3}Co_{1/3}Ni_{1/3}O_2$) and a provided cathode material (Example 4). Comparative Example A has an onset temperature for self-heating of about 170° C. based upon the graph. Example 4 ($Li[Li_{0.111}Mn_{0.389}Ni_{0.5}]O_2$) has a much higher onset temperature of self-heating of around 220° C.

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows. All references included in this disclosure are herein incorporated by reference in their entirety.

What is claimed is:

1. An electrochemical cell comprising at least one electrode, wherein the electrode comprises a composition comprising a lithium mixed metal oxide composition having the formula, $Li[Li_xNi_yMn_z]O_2$, wherein $x+y+z=1$, $0<x<0.20$, $0.28 \leq y \leq 0.75$, and $0.25 \leq z \leq 0.49$, said composition in the form of a single phase,
wherein the single phase has an O3 layered structure,
wherein the composition does not undergo a phase transformation to a spinel crystal structure when the electrode is incorporated into a lithium-ion battery and cycled for 100 full charge-discharge cycles at 30° C. and has a final capacity of greater than about 210 mAh/g at 4.6 V, and
wherein the electrochemical cell comprises an electrolyte that includes diethyl carbonate.

2. An electrochemical cell according to claim 1, wherein $0.05 \leq x \leq 0.17$.

3. An electrochemical cell according to claim 1, wherein the Mn is in a +4 oxidation state.

4. An electrochemical cell according to claim 1, wherein the composition has an onset temperature greater than about 170° C. when the composition is made into a pellet and subjected to accelerated rate calorimetry (ARC) testing.

5. An electrochemical cell according to claim 1, wherein the electrode has a final capacity that is greater than about 190 mAh/g.

6. An electrochemical cell according to claim 5, wherein the electrode has a final capacity that is greater than about 170 mAh/g.

7. A battery pack comprising at least one electrochemical cell according to claim 1.

8. An electronic device comprising a battery pack according to claim 7.

9. An electrochemical cell comprising at least one electrode, wherein the electrode comprises a composition comprising a lithium mixed metal oxide composition having the formula, $Li[Li_xNi_yMn_z]O_2$, wherein $x+y+z=1$, $0<x<0.20$, $0.28 \leq y \leq 0.75$, and $0.25 \leq z \leq 0.49$, said composition in the form of a single phase,
wherein the single phase has an O3 layered structure,
wherein the composition does not undergo a phase transformation to a spinel crystal structure when the electrode is incorporated into a lithium-ion battery and cycled for 100 full charge-discharge cycles at 30° C. and has a final capacity of greater than about 210 mAh/g at 4.6 V, and
wherein the electrochemical cell comprises an electrolyte that includes dimethyl carbonate or ethyl-methyl carbonate.

10. An electrochemical cell according to claim 9, wherein $0.05 \leq x \leq 0.17$.

11. An electrochemical cell according to claim 9, wherein the Mn is in a +4 oxidation state.

12. An electrochemical cell according to claim 9, wherein the composition has an onset temperature greater than about 170° C. when the composition is made into a pellet and subjected to accelerated rate calorimetry (ARC) testing.

13. An electrochemical cell according to claim 9, wherein the electrode has a final capacity that is greater than about 190 mAh/g.

14. An electrochemical cell according to claim 13, wherein the electrode has a final capacity that is greater than about 170 mAh/g.

15. A battery pack comprising at least one electrochemical cell according to claim 9.

16. An electronic device comprising a battery pack according to claim 15.

* * * * *

UNITED STATES PATENT AND TRADEMARK OFFICE
CERTIFICATE OF CORRECTION

PATENT NO. : 8,153,301 B2
APPLICATION NO. : 12/420128
DATED : April 10, 2012
INVENTOR(S) : Junwei Jiang It is certified that error appears in the above-identified patent and that said Letters Patent is hereby corrected as shown below:

Column 2,
Line 9, (Other Publications), delete "LiNi$_{frax;1;2}$Mn$_{frax;1;2}$O$_2$" and insert -- LiNi$_{1/2}$Mn$_{1/2}$O$_2$-- therefor.

Column 4,
Line 16, delete "thereof" and insert --thereof.-- therefor.

Column 4,
Line 24, delete "butylrolactone" and insert --butyrolactone-- therefor.

Column 4,
Line 62, delete "SHAWANIGAN" and insert --SHAWINIGAN-- therefor.

Column 6,
Line 63, delete "1.0 MA." And insert --1.0 mA.-- therefor.

Column 7,
Line 48, delete "electrodesl" and insert --electrodes-- therefor.

Column 7,
Line 50, delete "greather" and insert --greater-- therefor.

Column 7,
Line 52, delete "temperture" and insert --temperature-- therefor.

Signed and Sealed this
Thirty-first Day of July, 2012

David J. Kappos
*Director of the United States Patent and Trademark Office*